(No Model.)
J. P. PHILLIPS
HOE HANDLE.
No. 505,252. Patented Sept. 19, 1893.
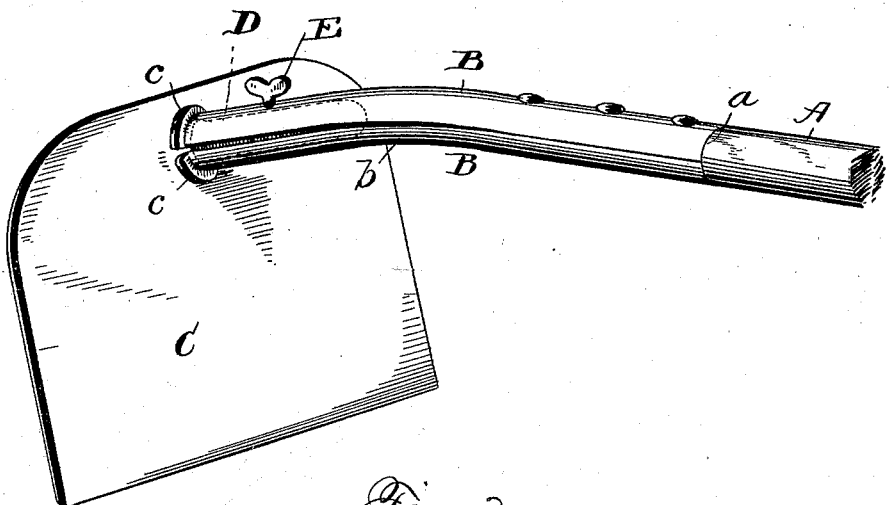
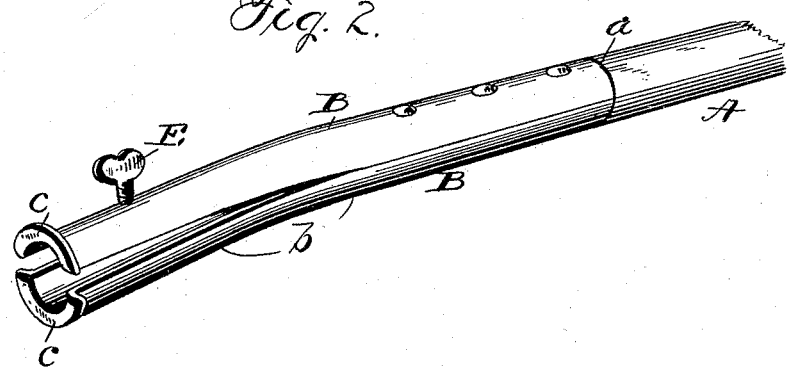
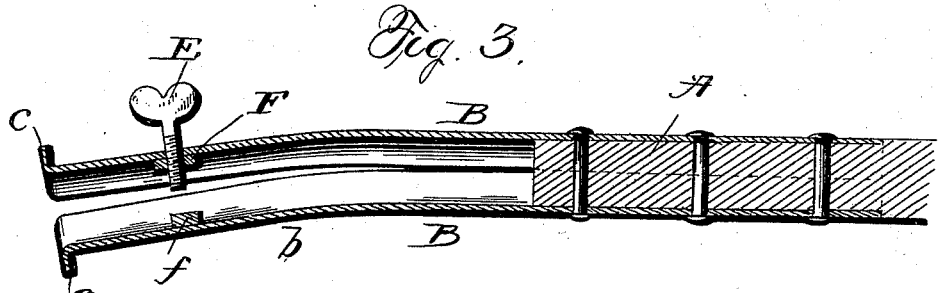
Witnesses
C. J. Williamson
E. S. Trull
Inventor
Jacob P. Phillips,
by Franklin H. Hough
his Atty.

UNITED STATES PATENT OFFICE.

JACOB PARKER PHILLIPS, OF YANTLEY CREEK, ALABAMA.

HOE-HANDLE.

SPECIFICATION forming part of Letters Patent No. 505,252, dated September 19, 1893.

Application filed April 6, 1893. Serial No. 469,334. (No model.)

*To all whom it may concern:*

Be it known that I, JACOB PARKER PHILLIPS, a citizen of the United States, residing at Yantley Creek, in the county of Choctaw and State of Alabama, have invented certain new and useful Improvements in Hoe-Handles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in handles for hoes and the like, and it has for its objects among others to provide an improved simple and cheap handle which can be readily attached to or detached from a hoe or other agricultural implement and which will serve to securely hold the hoe or other implement as firmly as if permanently attached thereto.

I form the handle proper of any suitable material and length and to its lower end attach two substantially semi-circular pieces of spring metal which embrace the handle proper and form a socket therefor, being secured thereto, preferably being set into the same so that the outer surfaces thereof will be flush with the periphery of the handle proper, the said spring pieces extending beyond the lower end of the handle and adapted to receive the shank or tang of any kind of a hoe and to be held thereto by means of a set screw passed through one of the said pieces and engaging a nut within the tang-receiving socket to hold the spring arms around the tang and the tang against movement therein. The lower ends of the spring metal pieces that extend beyond the lower end of the handle are bent downward at an angle to the other portion of the handle so as to give the proper inclination to the hoe.

Other objects and advantages of the invention will hereinafter appear and the novel features thereof will be specifically defined by the appended claim.

The invention in the present instance resides in the peculiar combinations and the construction, arrangement and adaptation of parts, whereby the desired ends as above outlined are accomplished, all as more fully hereinafter described, shown in the drawings, and then particularly pointed out in the claim.

The invention is clearly illustrated in the accompanying drawings, which, with the letters of reference marked thereon, form a part of this specification, and in which—

Figure 1 is a perspective view of my improved handle with a hoe held therein. Fig. 2 is a perspective view of the improved handle as it appears ready to receive the tang of a hoe. Fig. 3 is a longitudinal section through the handle.

Like letters of reference indicate like parts throughout the several views.

Referring now to the details of the drawings by letter, A designates the handle proper, of wood of the desired length to the lower end of which are secured the spring metal pieces B and B which are substantially semi-circular in cross section, the two being oppositely arranged and embracing the handle being preferably set into the same as shown so that their outer surfaces will be flush with the periphery of the handle A, and the shoulders thus formed as seen at $a$ will serve to prevent endwise displacement of the pieces B when the hoe is being used. These pieces B extend for a short distance beyond the lower end of the handle A and at a point just beyond the end of the handle they are inclined or curved downward as seen at $b$ so as to better receive and conform to the incline or curvature of the tang of the hoe or other implement to be held thereby. The lower ends of the pieces B are turned up at right angles to their length as seen at $c$ to bear against the edge of the hoe as shown to give a better bearing and prevent wearing of the ends of the said pieces by constant use of the device. The free ends of the spring pieces B are so connected and secured to the handle that their said ends will stand apart as shown so as to readily admit of the introduction of the tang of the hoe.

C is the hoe and D its tang; the latter is introduced into the opening between the ends of the pieces B and then a set screw E which is passed through the upper piece B and engages a nut F on the under side of said upper piece as shown, the said screw being designed to rest upon a projection $f$ on the upper face of the lower piece B as shown.

It will thus be seen that my improved handle is adapted for use with any kind of a hoe, that no special construction of the tang of the implement is necessary and that the device is simple, cheap of construction, and can be applied to a hoe or other implement by any one; it is durable, efficient and can be used with different sized tangs.

What I claim as new is—

The combination with the handle proper, of the two oppositely arranged semi-circular spring metal pieces secured at one end to said handle with their lower ends extended beyond the same and inclined, to receive a hoe-tang, the set screw passed through one of said pieces and a nut within the space inclosed by said pieces and engaging said screw, all substantially as shown and described.

In testimony whereof I affix my signature in presence of two witnesses.

JACOB PARKER PHILLIPS.

Witnesses:
P. M. SMITH,
A. H. CHESTNUT.